June 11, 1968 — W. W. MAYS — 3,387,402

LIVE FISH BAIT MEANS

Filed Oct. 21, 1965

INVENTOR
WILBURT W. MAYS
BY Jacob Trachtman
ATTORNEY

United States Patent Office 3,387,402
Patented June 11, 1968

3,387,402
LIVE FISH BAIT MEANS
Wilburt W. Mays, 2020 N. 8th St.,
Philadelphia, Pa. 19148
Filed Oct. 21, 1965, Ser. No. 500,084
8 Claims. (Cl. 43—41)

ABSTRACT OF THE DISCLOSURE

A live bait fishing lure, comprising: an elongated base formed of a length of plate with a fish hook at one end and having means for attachment of a fish line at the opposite end; a retainer ring affixed on said base and projecting on one side thereof between said means and hook, said ring being transverse of said length to receive therewithin live bait in alignment with said base; a spike projecting from said base between said opposite end and said ring, said spike being adapted for impaling and securing said bait thereon with said ring and base providing a protective guard therefor; said base including a longitudinal slot therethrough between said opposite end and said ring, said spike projecting through said slot of said base at said one side thereof and being movable therealong, said spike having a screw clamp for securing said spike at a desired position within said slot; a clacker flexibly attached to said ring, and a connector means joining said clacker to said fishing line at a point beyond said opposite end whereby said fish line may be jerked to excite said clacker. Said fishing lure also provides for said ring being split into a sturdy support segment, a flexible segment which may be adjusted tightly about said bait by squeezing and collapsing toward said base, and a semi-segment providing fingers which may be squeezed together on both sides of said bait for secure containment thereof on said lure, and said length of plate having a reverse bend at one end of said base providing a Z-shaped guard configuration across said hook.

---

This invention relates, in general, to a live fish bait means, and more particularly, to a live-bait fishing lure which provides a protective guard for the live bait.

Live bait lures in the past have been provided by feeding the bait, such as a minnow or the like, upon a fish hook. The minnow is usually impaled completely through by the hook, which is the sole means of securing and supporting it. This has proved, in the main, to be unsatisfactory as the live bait's life and usefulness are shortened considerably. The live bait is usually injured when placed on the hook and may be severely mangled by a striking fish. Furthermore, it has proven to be very difficult to cast such prior art live bait lures very far out onto the water without a further injury and possible disconnection of the live bait.

Therefore, to overcome the foregoing and other difficulties of the prior art, the general object of this invention is to provide a novel and improved live bait fishing lure.

It is the principal object of this invention to prolong the life and usefulness of live bait, such as a minnow, on a fishing lure.

It is an object of this invention to provide a protective guard for live bait on a fishing lure.

Another object of this invention is to provide a manner of securing live bait on a lure without serious injury thereto and yet permitting a free and natural swimming movement thereby.

A further object is to provide a new and improved live bait fishing lure which may be cast considerable distances without injuring or disconnecting the bait therefrom.

An additional object of this invention is to provide a fishing lure with a clacking sound that attracts and antagonizes nearby fish, and which clacking sound may be selectively initiated by the fisherman.

It is still another object to provide a live bait fishing lure which is economical to produce by utilizing conventional, currently available standardized components and materials that lend themselves to standard mass production techniques.

For the purpose of illustrating the invention, there are shown in the drawings forms which are presently preferred; it being understood, however, that this invention is not limited to the precise arrangements and instrumentalities shown.

Other objects and a fuller understanding of the invention may be had by referring to the following description and claims, taken in conjunction with the accompanying drawing, in which:

Referring to the drawings in detail, wherein like numeral indicate like elements, there is shown in FIGURE 1 a representation of the live bait fishing lure of the present invention designated generally as 10.

Figure 1:
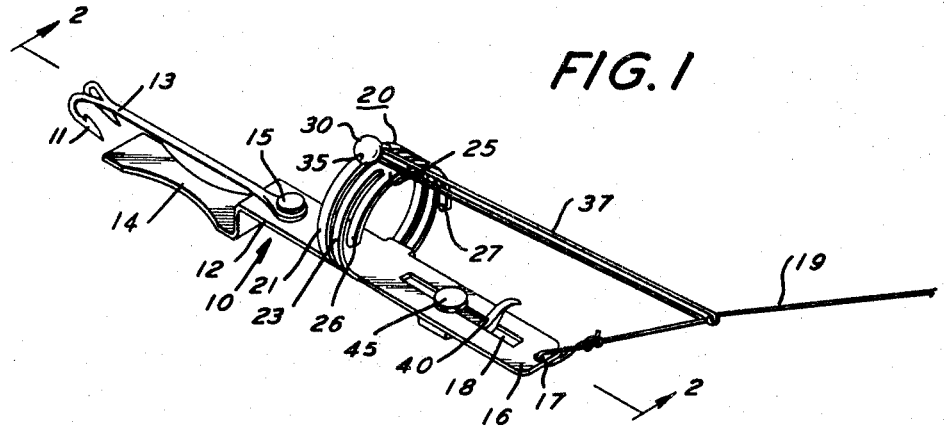
FIGURE 1 is a perspective view illustrating the live bait fishing lure of the present invention.
Figure 2:
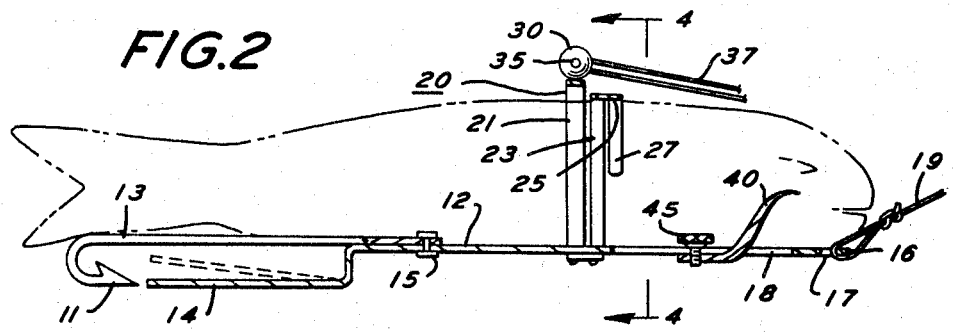
FIGURE 2 is a side elevational view, partly in section, of the invented live bait fishing lure.
Figure 3:
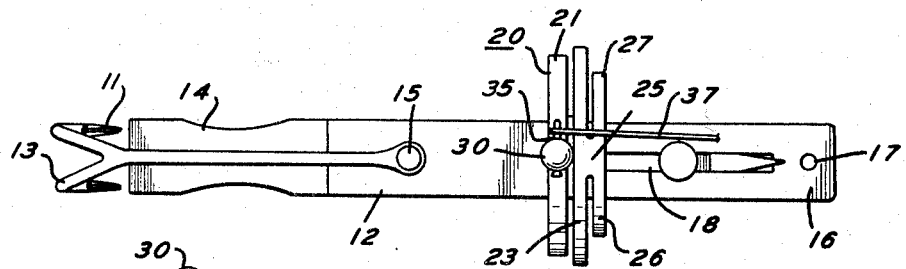
FIGURE 3 is a plan view of the invention shown in FIGURE 2.

The lure 10 has an elongated base 12 formed out of a length of plate which may be a suitable, sturdy and durable material, such as a presently available metal or a plastic. A fish hook 13 projects beyond one end 14 of the base 12 and is affixed thereon by a rivet 15 at the downward disposition illustrated. The base 12 has a reverse bend of Z-shaped configuration which disposes the end 14 at the same level with the tips 11 of the hook 13. The base 12 is somewhat flexible allowing the end 14 to bend upward, as represented by the phantom lines, and thereby provides a guard across the open portion of hook 13. The opposite end 16 of the base 12 has an eye 17 therethrough providing means for attachment to a leader or fish line 19, in a manner common to the fishing lure art. The base 12 also includes a longitudinal slot 18 therethrough at the front end 16.

Figure 4:
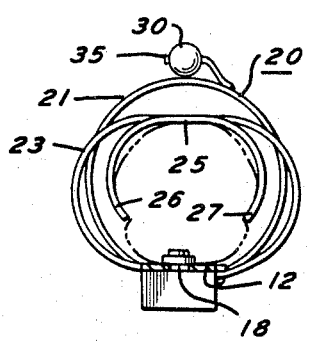
FIGURE 4 is a sectional view taken along line 4—4 of FIGURE 2.

A retainer ring 20 is securely affixed on the base 12 at a position between the rivet 15 and one end of the slot 18, as shown. It is understood, however, that the base 12 and the ring 20 may be punched from a single plate and thus, integrally formed together. The ring 20 projects upward from one side of the base 12 and has a transverse disposition with respect to the base. The ring 20 is split into three segments, a support segment 21, a flexible segment 23, and a semi-segment 25 with fingers 26 and 27. As may be best visualized by reference to FIGURES 1 and 4, the ring 20 is open for reception therein of live bait, such as the minnow indicated in phantom.

A clacker may be provided by a brightly colored bead 30 strung on a stiff and flexible wire 35. One end of the wire 35 is affixed to the support segment 21 of ring 20 in a cantilever fashion, and the remaining, free end of wire 35 is enlarged to prevent passage of the bead 30. A connector means such as a flexible band 37 may be used to connect the free unfixed portion of wire 35 to fish line 19 at a point beyond the connection at eye 17, in the manner illustrated.

An impaling spike 40 is provided to project through the slot 18 in base 12. The spike 40 is movable along the slot 18 and is adjustably clamped at any desired position therealong by tightening of screw 45 which provides a screw clamp thereat. Notice that the spike 40 has an S-shaped bend with the tip inclined toward the front end 16.

Live bait, such as a minnow, may be secured on the lure 10 by feeding it through the ring 20 and impaling it on the spike 20. Different lengths of live bait may be accommodated by an adjustment of the clamp screw 45 and spike 40. The flexible segment 23 is collapsed downward to bear on the live bait and the fingers 26, 27 of semi-segment 25 are pinched inward to bear on the sides of the bait. It must be pointed out that the spike 40 is impaled through the fleshy underjaw or throat of the minnow and therefore, does not seriously injure it. The forward inclination of the spike 40 prevents the live bait from sliding backwards and off the lure 10. The ring 20 securely grasps and positions the live bait in alignment with the base 12 which provides a protective guard along the entire length of live bait. The tail portion of the live bait is completely free for a natural swimming motion. The afore-described lure 10, together with live bait, may be cast a considerable distance without any danger of injury or disconnection of the bait.

A nearby fish may be attracted and antagnoized into striking by a slight jerk on the fish line 19 which pulls band 37 and excites the clacker bead 30 to move outward and snap back against the ring 20. The resulting clacking noise infuriates an aggressive game fish into attack, thereby providing a very effective fishing lure.

The present invention may be embodied in other specific forms without departing from the spirit or essential attributes thereof, and accordingly, reference should be made to the appended claims, rather than to the foregoing specification as indicating the scope of the invention.

What is claimed is:

1. A live bait fishing lure, comprising: an elongated base formed of a length of plate with a fish hook at one end and having means for attachment of a fish line at the opposite end; retainer ring affixed on said base and projecting on one side thereof between said means and hook, said ring being transverse of said length to receive therewithin live bait in alignment with said base; and a spike projecting from said base between said opposite end and said ring, said spike being adapted for impaling and securing said bait thereon with said ring and base providing a protective guard therefor, said base including a longitudinal slot therethrough between said opposite end and said ring, said spike projecting through said slot of said base at said one side thereof and being movable therealong, said spike having a screw clamp for securing said spike at a desired position within said slot.

2. A live bait fishing lure in accordance with claim 1 wherein said spike is curved with an inclination toward said opposite end.

3. A live bait fishing lure, comprising: an elongated base formed of a length of plate with a fish hook at one end and having means for attachment of a fish line at the opposite end; a retainer ring affixed on said base and projecting on one side thereof between said means and hook, said ring being transverse of said length to receive therewithin live bait in alignment with said base; a spike projecting from said base between said opposite end of said ring, said spike being adapted for impaling and securing said bait thereon with said ring and base providing a protective guard therefor, a clacker flexible attached to said ring, and a connector means joining said clacker to said fish line at a point beyond said opposite end whereby said fish line may be jerked to excite said clacker.

4. A live bait fishing lure in accordance with claim 3 wherein said connector means is an elastic band.

5. A live bait fishing lure in accordance with claim 3 wherein said clacker is a brightly colored bead strung on a stiff flexible wire affixed in cantilever fashion on said ring so said clacker may strike against said ring whenever excited.

6. A live bait fishing lure, comprising: an elongated base formed of a length of plate with a fish hook at one end and having means for attachment of a fish line at the opposite end thereof, said length of plate having a reverse bend at said one end to provide a Z-shaped guard configuration across said hook, a retainer ring affixed on said base and projecting on one side thereof between said means and hook, said ring being transverse of said length to receive therewithin live bait in alignment with said base, and said ring being split into a sturdy support segment, a flexible segment which may be adjusted tightly about said bait by squeezing and collapsing toward said base, and a semi-segment providing fingers which may be squeezed together on both sides of said bait for a secure containment thereof on said lure; a brightly colored clacker bead strung on a stiff and flexible wire affixed in cantilever fashion on said support segment of said ring; an elastic band connecting the unfixed portion of said wire to said fish line at a point beyond said opposite end so said line may be jerked to excite said clacker bead to strike against said ring; and an adjustable spike projecting from said base between said opposite end and said ring, said spike being adapted for impaling and securing said bait thereon with said ring and base providing a protective guard therefor.

7. A live bait fishing lure, comprising: an elongated base formed of a length of plate with a fish hook at one end and having means for attachment of a fish line at the opposite end; a retainer ring affixed on said base and projecting on one side thereof between said means and hook, said ring being transverse of said length to receive therewithin live bait in alignment with said base; and a spike projecting from said base between said opposite end and said ring, said spike being adapted for impaling and securing said bait thereon with said ring and base providing a protective guard therefor; said ring being split into a sturdy support segment, a flexible segment which may be adjusted tightly about said bait by squeezing and collapsing toward said base, and a semi-segment providing fingers which may be squeezed together on both sides of said bait for a secure containment thereof on said lure.

8. A live bait fishing lure, comprising: an elongated base formed of a length of plate with a fish hook at one end and having means for attachment of a fish line at the opposite end; a retainer ring affixed on said base and projecting on one side thereof between said means and hook, said ring being transverse of said length to receive therewithin live bait in alignment with said base; and a spike projecting from said base between said opposite end and said ring, said spike being adapted for impaling and securing said bait thereon with said ring and base providing a protective guard therefor; said length of plate having a reverse bend at said one end of said base providing a Z-shaped guard configuration across said hook.

References Cited

UNITED STATES PATENTS

| 841,951 | 1/1907 | Evans | 43—44.4 |
| 1,105,172 | 7/1914 | Anschutz | 43—44.4 |
| 1,533,092 | 4/1925 | Bonbright | 43—44.8 |
| 2,756,536 | 7/1956 | Ware | 43—44.8 |
| 3,061,968 | 11/1962 | Stroud | 43—44.8 |

ALDRICH F. MEDBERY, *Primary Examiner.*

SAMUEL KOREN, *Examiner.*

D. J. LEACH, *Assistant Examiner.*